US012775996B2

(12) United States Patent
Kwong et al.

(10) Patent No.: US 12,775,996 B2
(45) Date of Patent: Oct. 27, 2026

(54) CNN SEAMLESS TILE PROCESSING FOR LOW-POWER INFERENCE ACCELERATOR

(71) Applicants: Advanced Micro Devices, Inc., Santa Clara, CA (US); ATI Technologies ULC, Markham (CA)

(72) Inventors: Tung Chuen Kwong, Markham (CA); Ying Liu, Markham (CA); Akila Subramaniam, Austin, TX (US)

(73) Assignees: Advanced Micro Devices, Inc., Santa Clara, CA (US); ATI Technologies ULC, Markham (CA)

(*) Notice: Subject to any disclaimer, the term of this patent is extended or adjusted under 35 U.S.C. 154(b) by 248 days.

(21) Appl. No.: 17/957,689

(22) Filed: Sep. 30, 2022

(65) Prior Publication Data

US 2024/0112297 A1 Apr. 4, 2024

(51) Int. Cl.
*G06T 1/60* (2006.01)

(52) U.S. Cl.
CPC .................................... *G06T 1/60* (2013.01)

(58) Field of Classification Search
CPC ........................................................ G06T 1/60
See application file for complete search history.

(56) References Cited

U.S. PATENT DOCUMENTS 11,195,080 B1 * 12/2021 Nama .................... G06N 3/045
11,250,061 B1 * 2/2022 Nama .................... G06N 3/084
11,263,170 B1 * 3/2022 Nama ................. G06F 15/7885
2016/0239706 A1 * 8/2016 Dijkman ................ G06N 3/045
2019/0066257 A1 * 2/2019 Daga ........................ G06T 9/002
2020/0097821 A1 * 3/2020 Nayak ..................... G06N 3/082
2020/0104690 A1 * 4/2020 Bai ...................... G06F 9/30098
2020/0104691 A1 * 4/2020 Bai ......................... G06N 3/063
2020/0394500 A1 * 12/2020 Hill ........................... G06N 3/04
2021/0089316 A1 * 3/2021 Rash ....................... G06N 3/045
2022/0075659 A1 * 3/2022 Mohapatra .......... G06F 9/30123
2022/0309316 A1 * 9/2022 Nama ..................... G06N 3/045
2023/0098994 A1 * 3/2023 Labatie ..................... G06N 3/08
706/25
2023/0104845 A1 * 4/2023 Ray ........................... G06F 7/08
711/126
2023/0260536 A1 * 8/2023 Xu ........................... G10L 25/63
704/231

(Continued)

OTHER PUBLICATIONS

Pinckaers H, Van Ginneken B, Litjens G. Streaming convolutional neural networks for end-to-end learning with multi-megapixel images. IEEE transactions on pattern analysis and machine intelligence. Aug. 26, 2020;44(3):1581-90.*

(Continued)

*Primary Examiner* — Sarah Lhymn
(74) *Attorney, Agent, or Firm* — Volpe Koenig

(57) ABSTRACT

Methods and devices are provided for processing image data on a sub-frame portion basis using layers of a convolutional neural network. The processing device comprises memory and a processor. The processor is configured to determine, for an input tile of an image, a receptive field via backward propagation and determine a size of the input tile based on the receptive field and an amount of local memory allocated to store data for the input tile. The processor determines whether the amount of local memory allocated to store the data of the input tile and padded data for the receptive field.

20 Claims, 7 Drawing Sheets

500

(56) References Cited

U.S. PATENT DOCUMENTS

2024/0005458 A1 1/2024 Kwong et al.

OTHER PUBLICATIONS

Araujo, A., et. al., "Computing Receptive Fields of Convolutional Neural Networks", Distill, Nov. 4, 2019, downloaded from https://distill.pub/2019/computing-receptive-fields/ on Sep. 29, 2019, 19 pgs.

* cited by examiner

500

CNN SEAMLESS TILE PROCESSING FOR LOW-POWER INFERENCE ACCELERATOR

BACKGROUND

Computer vision (CV) is burgeoning technology field which includes techniques for assisting computers to gain an understanding of (e.g., perform inference on) the content of images (i.e., image data). Combining the use of real-time, low latency CV inference with conventional CV algorithms is growing in importance to industries (e.g., automotive industry and gaming industry) for image processing of time sensitive applications, such as applications used for virtual reality, augmented reality, head-mount displays, automotive perception systems and advanced driver assistance systems.

BRIEF DESCRIPTION OF THE DRAWINGS

A more detailed understanding can be had from the following description, given by way of example in conjunction with the accompanying drawings wherein.

DETAILED DESCRIPTION

Figure 1:
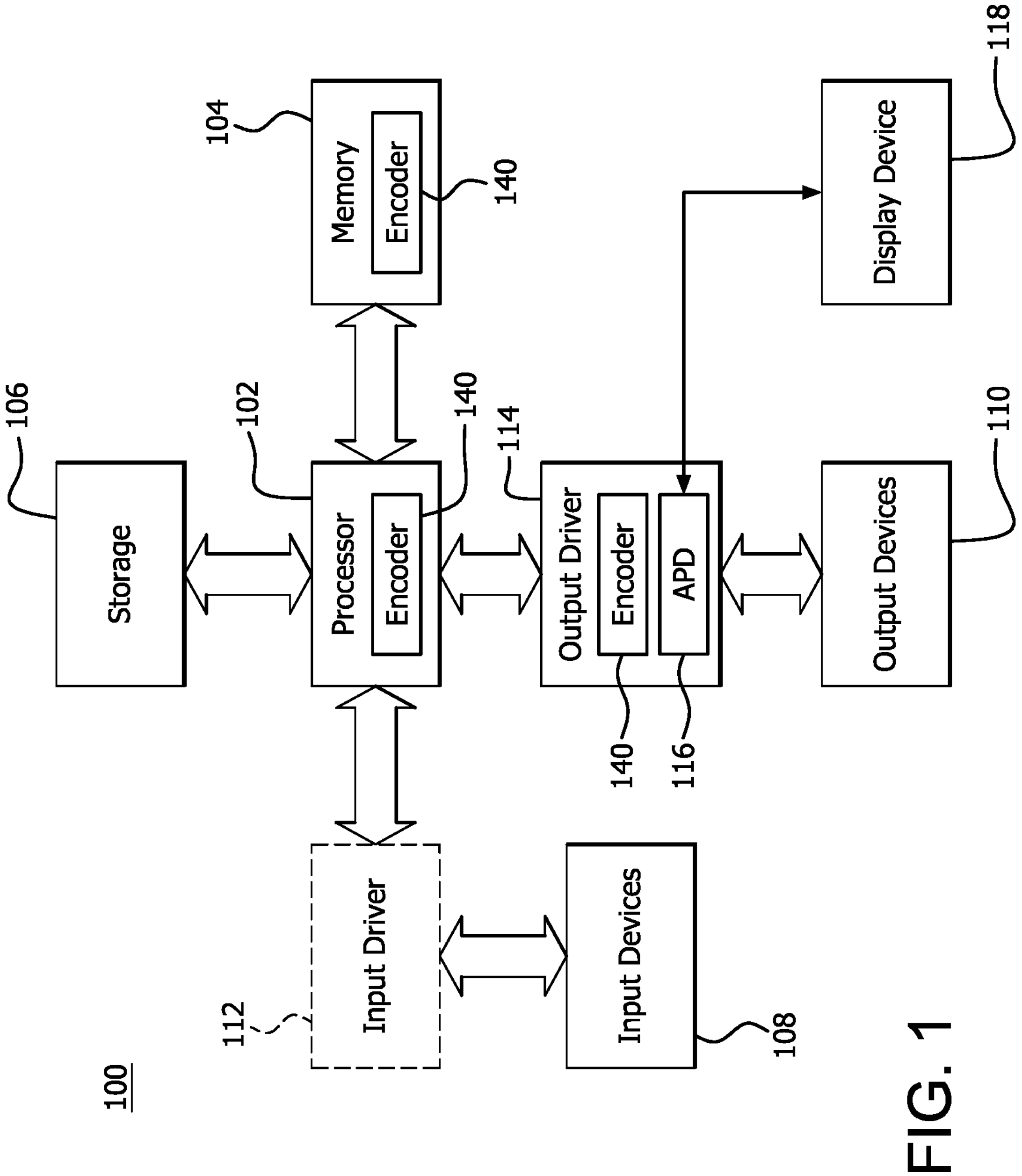
FIG. 1 is a block diagram of an example device in which one or more features of the disclosure can be implemented.

Convolutional neural networks (CNNs) are used to perform various tasks in image processing, such as image classification, object detection and image segmentation. CNNs learn from inputs and adjust parameters to make accurate predictions of images. CNNs are particularly useful in image processing because they extract features from images and efficiently reduce the number of image parameters without reducing image quality.

During forward propagation of a CNN (i.e., moving from an input layer to an output layer), feature maps (or activation maps) are generated by applying filters to input layers (e.g., input images) which produce different versions (e.g., downsampled versions of the images having multiple features but at a lower resolution) of the images. The filters are used to extract and identify different features (edges, lines, textures and other features) present in an image and processed (e.g., pooled) to produced output layers, which are used to make inferences and predictions of the images for tasks, such as image classification, object detection (e.g., objects in the image) and image segmentation. During backward propagation of a CNN (i.e., moving from the output layer to the input layer), parameters are adjusted or corrected to improve the accuracy of the inferences and predictions.

Tiling (or binning) is a technique used in image processing which reduces the processing latency (i.e., the amount of time (delay) incurred from when the image data is available for processing to when the available image data is processed). The negative impact of processing latency is highly detrimental to the effectiveness of time sensitive applications.

Tiling divides a frame into sections (e.g., tiles or bins) and renders one tile of a frame before rendering another tile of the frame. For example, if a frame (or image) is split into four equal tiles (i.e., top left quadrant, top right quadrant, bottom left quadrant and bottom right quadrant), a first tile (e.g., top left quadrant) is rendered before proceeding to render one of the next tiles. Then, one of the other tiles (e.g., top right quadrant) is rendered before proceeding to render one of the last two tiles, and so on, until each of the tiles of the frame are rendered. Accordingly, because portions (e.g., tiles or bins) of a frame are processed when they become available for processing, the processing latency is reduced by processing the portion of frame data that is available rather than waiting for the whole frame to be available for processing.

In addition, each tile is processed on a pixel granularity and the processor determines, during rasterization, whether or not pixels corresponding to a primitive are located in a tile. Therefore, when the pixels are determined to not be located in one or more tiles during rasterization, the processing for those pixels during the pixel shader stage can be skipped, reducing the amount of work. For example, when an object crosses between two tiles, the pixels of the primitive corresponding to the object located in a first tile can be processed without processing the pixels of the object located in a second tile. Then, when the second tile is processed, the pixels of the object located in the second tile are processed without re-processing the pixels of the object located in the first tile. Accordingly, duplicate processing of pixels is avoided during the pixel shader stage.

Inferencing algorithms used for CNNs are computationally intensive (e.g., can include billions of multiply accumulate operations to produce an inference) and expensive (e.g., increased power consumption) to execute. For example, in an accelerated processor (e.g., a low-power inference accelerator such as an intelligence processing unit (IPU) or a tensor processing unit (TPU)), a large amount of power is typically consumed to access memory (e.g., double data rate (DDR) memory), external to the accelerated processor due to the high bandwidth requirement for CNN processing.

Tiling facilitates reducing the external bandwidth used during CNN image processing by reducing the amount of data to be processed and stored before proceeding to a next portion of video to be processed and stored. That is, because each tile includes less data to be processed than a whole frame of data, less data is stored in memory local to the accelerated processor (i.e., local memory) before processing and storing the next portion of data.

While tiling helps reduce the external bandwidth, efficient CNN image processing (i.e., less power consumption while maintaining visual quality) of the data depends on the tile size (e.g., number of pixels per tile) determined for the frame. Decreasing the size of the tile increases the probability of producing artifacts at tile boundaries, resulting in increased power consumption to perform post merging algorithms used to reduce the artifacts. Increasing the size of the tile, however, results in increased power consumption used to perform additional computations (e.g., padding computations due to tile overlap).

Features of the present disclosure provide devices and methods of determining a tile size to efficiently processing image data using a CNN. The devices and methods described herein determine an input tile size which decreases power consumption while maintaining a visual quality. An input tile size is determined such that the resulting output tile does not generate artifacts. The input tile size is also determined based on an amount of local memory (e.g., register files and local data store (LDS) memory) allocated (e.g., available) to store the data of each tile. For example, the input tile size is determined based on an amount of local memory allocated (e.g., available) to maintain a selected data reuse technique (e.g., an activation-stationary technique of storing the data of intermediate activation maps (also referred to as feature maps) in the local memory, a weight-stationary data reuse technique of storing weight data in the local memory, or another type of data reuse technique).

Features of the present disclosure provide devices and methods which determine an input receptive field, via backward propagation of a CNN. Based on the receptive field, a smallest input tile size is determined which is constrained by the amount of local memory available to store the data of each tile and which produces a target output tile that does not generates border artifacts. In addition, determining the input tile size using the receptive field avoids additional computation overheads (e.g., padding computations) from tile overlap.

A method of processing images using a convolutional neural network is provided which comprises determining, for an input tile of an image, a receptive field via backward propagation. The method also comprises determining a size of the input tile based on the receptive field and an amount of local memory allocated to store data for the input tile.

An image processing device is provided which comprises memory and a processor. The processor is configured to determine, for an input tile of an image, a receptive field via backward propagation and determine a size of the input tile based on the receptive field and an amount of local memory allocated to store data for the input tile.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. As shown in FIG. 1, the output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. In addition to processing compute and graphics rendering commands and providing pixel output to display device 118, APD 116 may also control the encoder 140 for encoding video images according to features of the disclosure. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
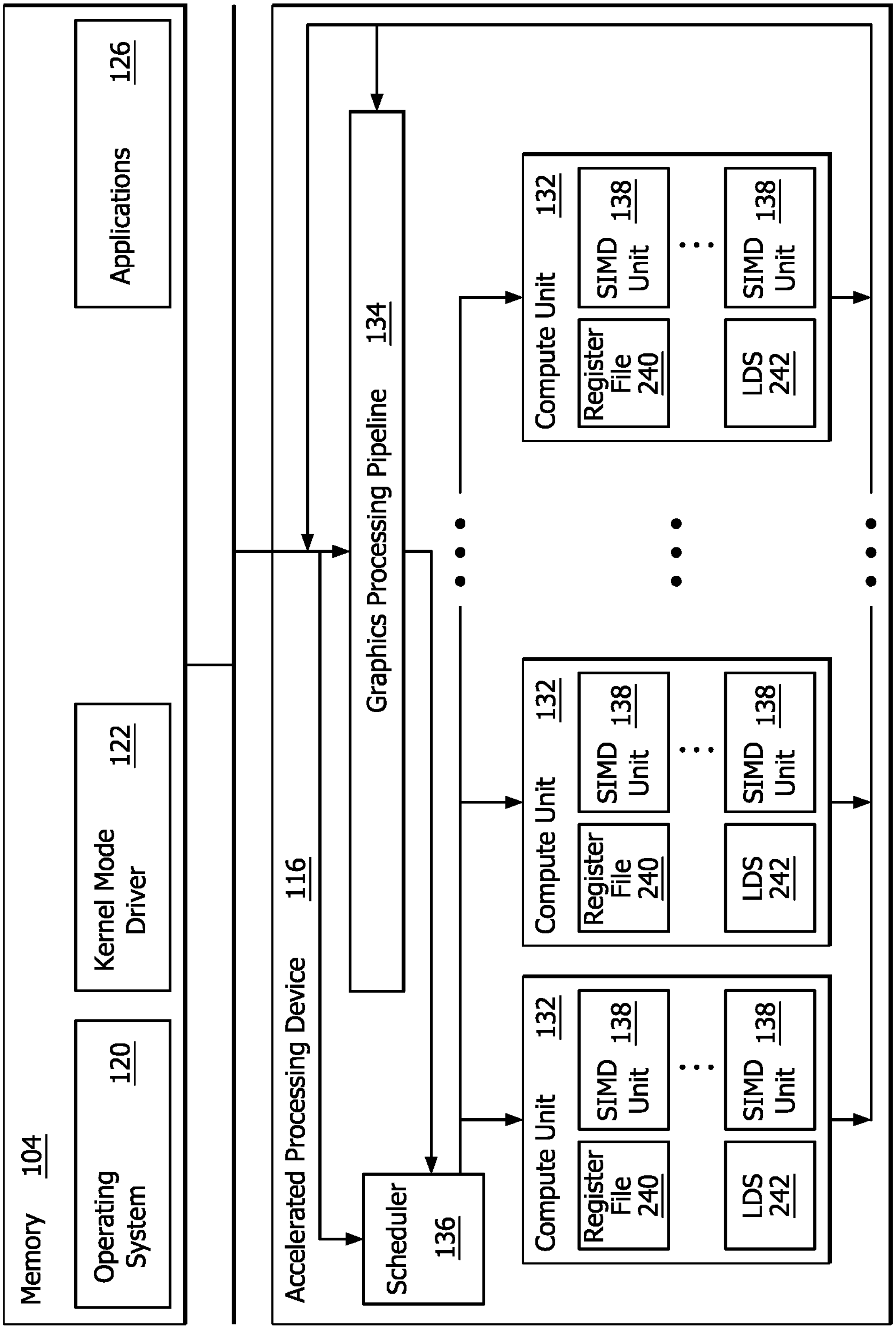
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138. For example, scheduler 136 is used to schedule processing of image data on a sub-frame portion (e.g., slice or tile) basis.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
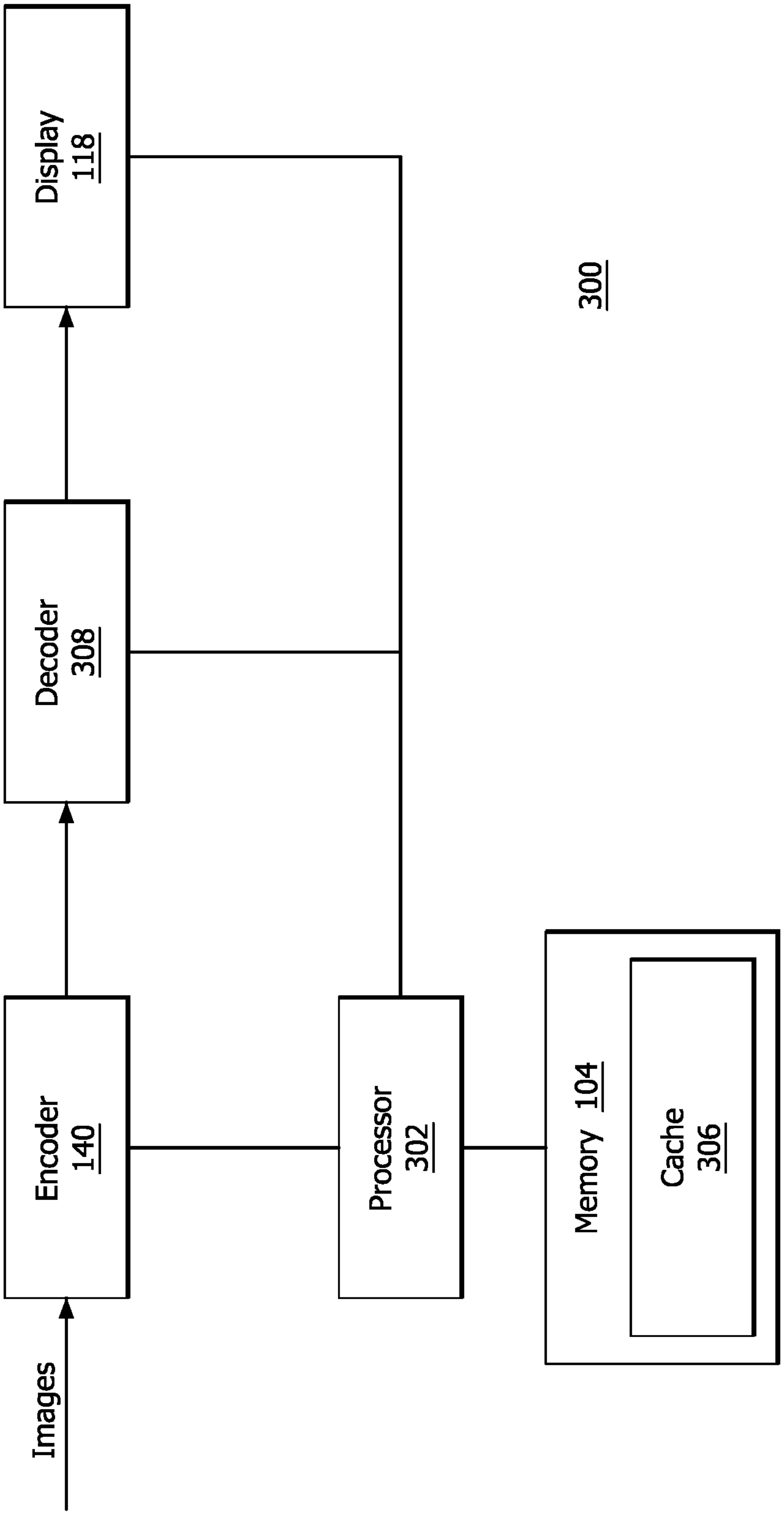
FIG. 3 is a block diagram illustrating exemplary components of a processing device in which one or more features of the disclosure can be implemented.

FIG. 3 is a block diagram illustrating exemplary components of a processing device 300 in which one or more features of the disclosure can be implemented. Processing device 300 is used to process image data as described in more detail below. As shown in FIG. 3, processing apparatus 300 comprises processor 302, memory 104, including cache 306, encoder 140, decoder 308 and display 118. Alternatively, decoder 308 and display 118 can be separate from device 300 and in communication with processing device 300 via a wired or wireless network.

As shown in FIG. 3, processor 302 is in communication with encoder 140, memory 104 (which includes cache 306), decoder 308. and display 118 (e.g., via display controller). Encoder 140 is configured to receive video images and encode the images to be decoded by decoder 308 and displayed at display device 118. The images can be received from one or more sources, such as a video capture device (e.g., a camera), a storage device (e.g., storage 106), a video content provider, and a device for generating graphics (e.g., APD 116).

Processor 302 is, for example, an accelerated processor, such as APD 116 (shown in FIGS. 1 and 2) or a low power inference accelerator (e.g., an intelligence Processing Unit (IPU) configured for machine learning and artificial intelligence, a tensor processing unit (TPU) tailored for inferencing, or other low power inference accelerator). Processor 302 is configured to perform various functions, as described in detail herein, for implementing features of the present disclosure. Processor 302 is configured to receive frames of image data, comprising a plurality of sub-frame portions (e.g., slices or tiles), and process, using layers of a CNN, the frames of image data on a sub-frame portion basis.

For example, processor 302 is configured to schedule frames to be processed by a CNN. The processor 302 is also configured to determine, for an input tile of an image, a receptive field via backward propagation and determine a size of the input tile based on the receptive field and an amount of local memory allocated to store data for the input tile. The processor 302 is also configured to perform a forward inference processing using the determined tile size and store the data for the input tile to non-local memory without storing the padded data for the receptive field to non-local memory The processed image data is provided to display device 118 for displaying the image data. The display device 118, is for example, a head mounted display, a computer monitor, TV display, a display in an automobile or another display device configured to display image data.

Figure 4:
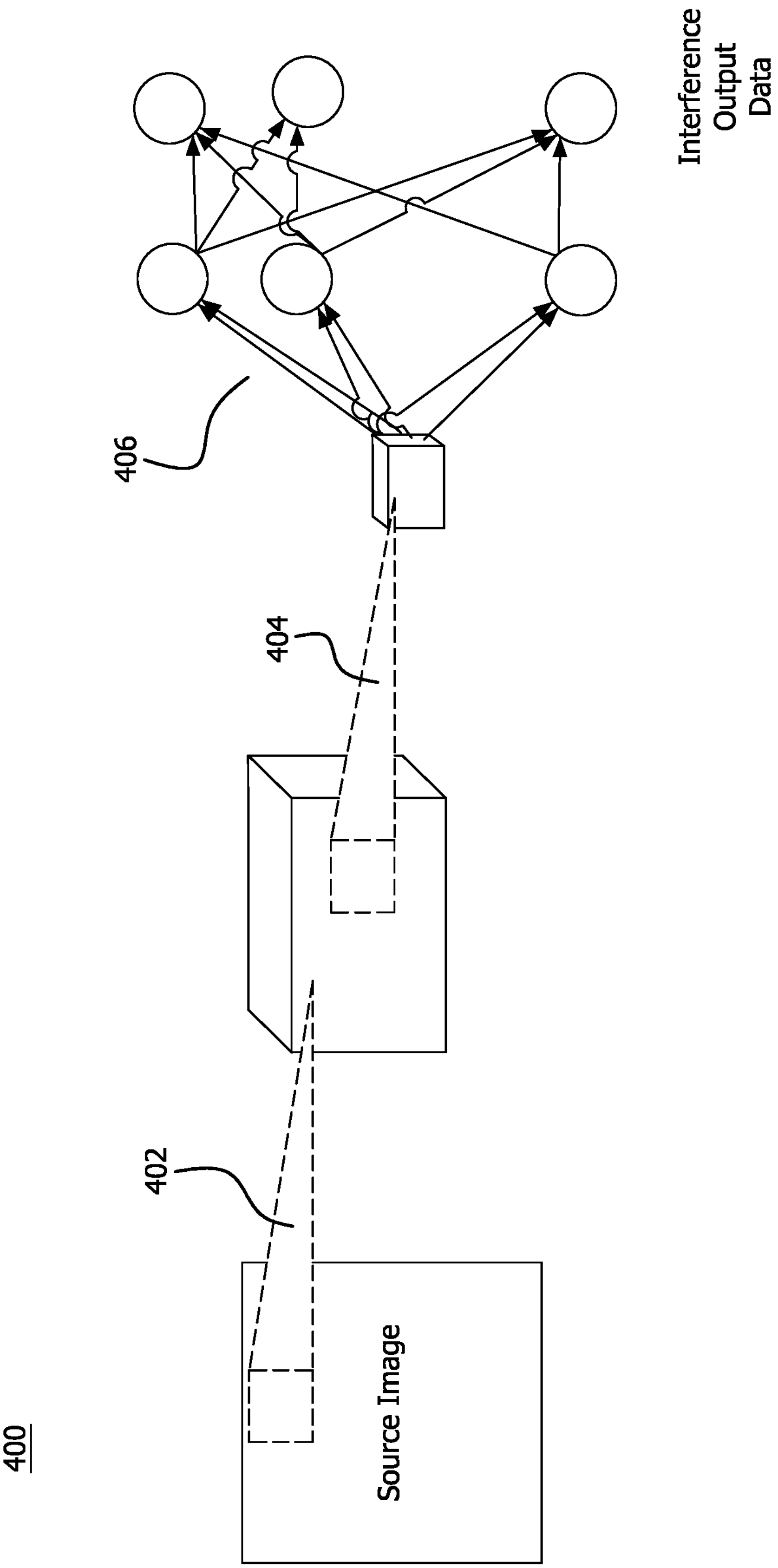
FIG. 4 is a block diagram illustrating an example flow for processing image data for an automotive application according to features of the disclosure.

FIG. 4 illustrates an example of different processing layers of a CNN 400 used to process image data. The CNN 400 shown in FIG. 5 includes a convolutional layer 402, a max pooling layer 404 and a rectified linear unit (RelU) layer 406. The layers shown in FIG. 4 are merely an example. Features of the disclosure can be implemented by processing image data on a sub-frame portion basis using any number of layers of a CNN, including the same layers or different layers than those shown in FIG. 6.

As described above, features of the present disclosure efficiently process image data by determining, via backward propagation of a CNN, an input tile size based a receptive field. Based on the receptive field, a smallest input tile size is determined which is constrained by the amount of local memory available to store the data of each tile and which produces a target output tile that does not generates border artifacts. In addition, determining the input tile size using the receptive field avoids additional computation overheads (e.g., padding computations) from tile overlap.

Figure 5:
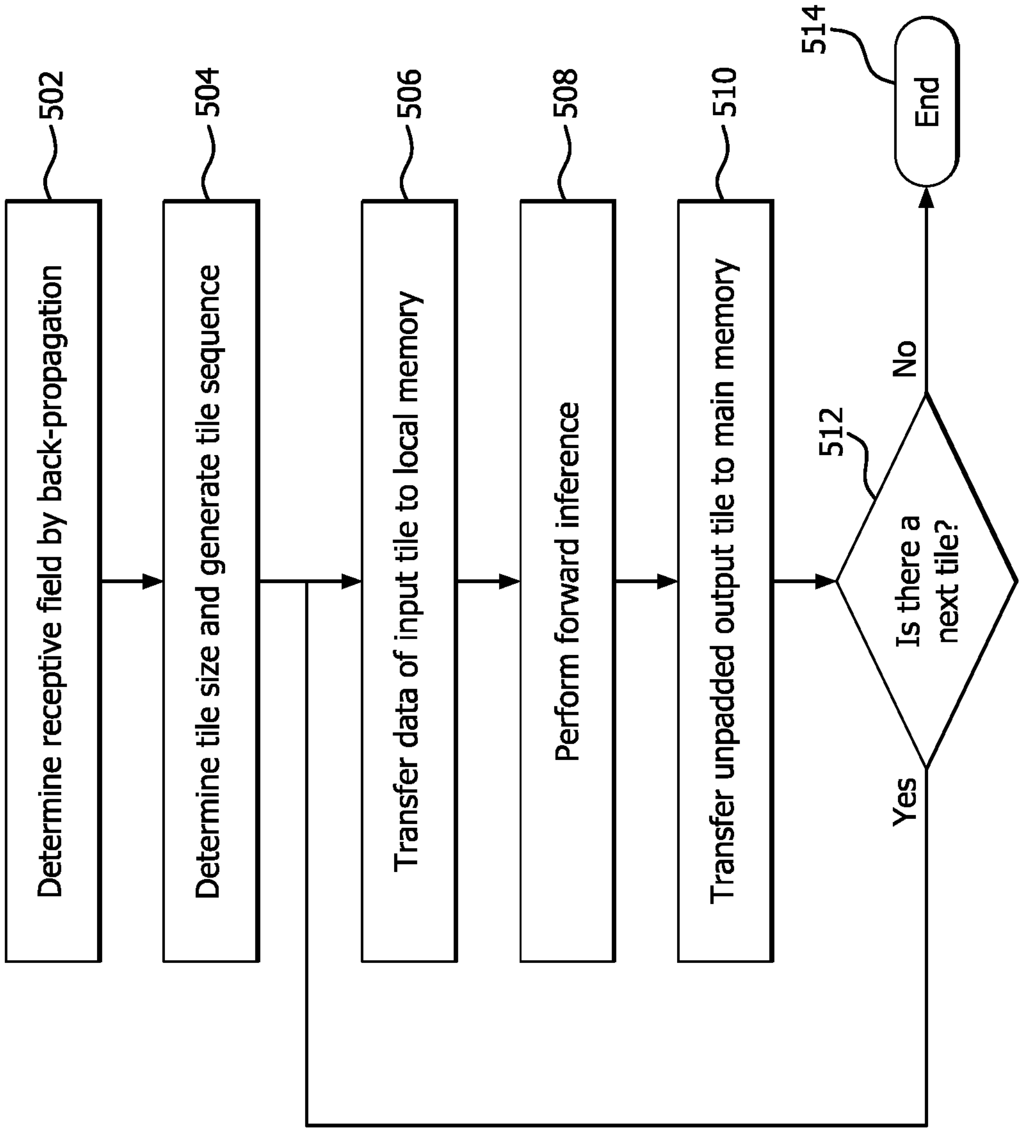
FIG. 5 illustrates an example method of image processing according to features of the disclosure.

FIG. 5 illustrates an example method 500 of image processing using a CNN according to features of the disclosure. The example method 500 is now described with reference to FIG. 6.

Figure 6:
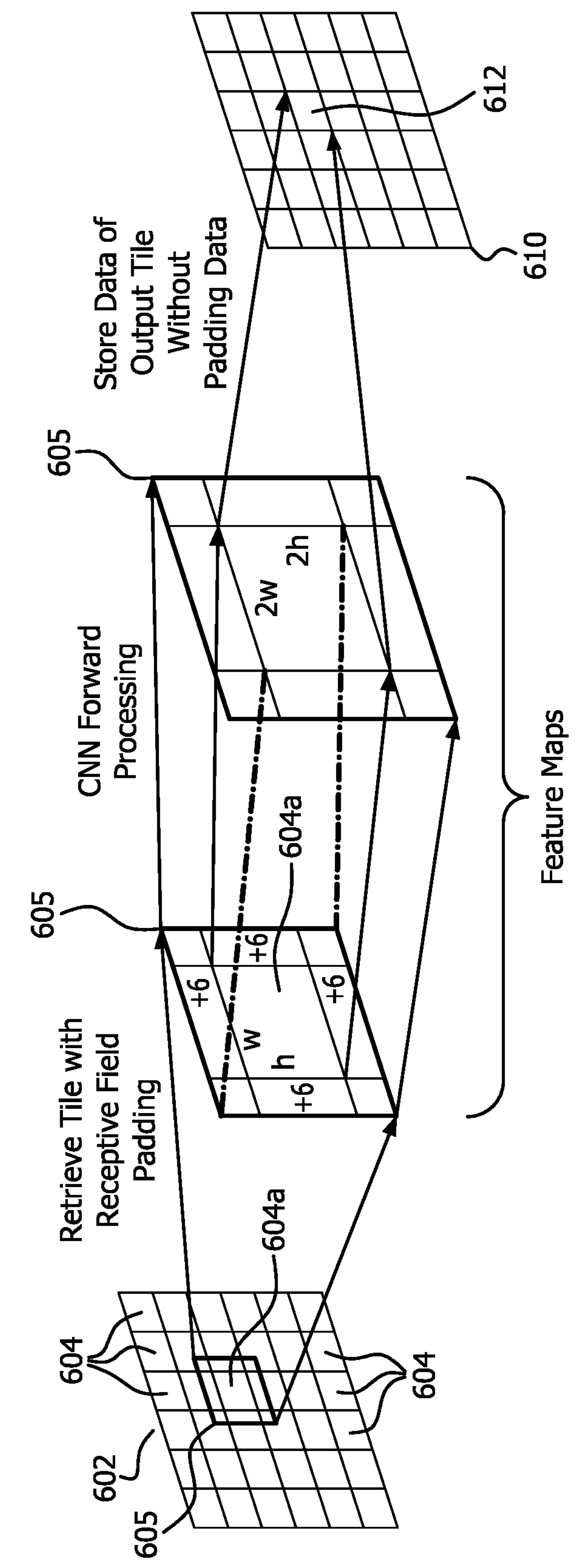
FIG. 6 is a block diagram illustrating an example flow of image processing according to features of the disclosure.

FIG. 6 is a block diagram illustrating an example flow of single image super-resolution (SISR) processing (i.e., enhancing the resolution of an image from low-resolution to high resolution) using a CNN according to features of the disclosure.

As shown in FIG. 6, an input image 602 is divided into a plurality of tiles 604. The number of tiles 604 input image 602 shown in FIG. 6 is merely an example. Features of the present disclosure can be implemented for any number of tiles of an image. For simplified explanation, the processing of a single target tile 604*a* is shown in FIG. 6. Features of the present disclosure are used to efficient process each of the input tiles 604 to produce a corresponding output tile. In addition, the size and of the receptive field 605 and location of the receptive field 605 relative to the tile 604*a* being processed is merely an example. Features of the present disclosure can be implemented for receptive fields having sizes and relative locations different from those shown in FIG. 6.

As shown at block 502, the method 500 includes determining, via backward propagation of the CNN, a receptive field 605 of an input region around the tile being processed. A receptive field is a parameter used to associate an output feature (e.g., edge, line, texture, or other features) to an input region of a CNN and is defined as the size of the input region in the input which produces the output feature.

A receptive field is determined, via backward propagation, for each input tile (e.g., tiles 604) to be processed. For example, a receptive field 605 is determined for the tile 604*a* currently being processed in FIG. 6. The receptive field is determined, using different known methods for calculating receptive fields, and is determined, for example, by calculating a receptive field size, stride, padding, and a center of a receptive field region.

As shown at block 504, the method 500 includes determining an input tile size and generating a tile sequence (e.g., determining memory addresses, tile sizes and padding sizes to process each tile in the image). That is, for each tile 604 in the input image 602, an input tile size is determined, via backward propagation, using a determined receptive field. For example, an input tile size is determined for tile 604*a*.

The input tile size is determined based on the receptive field (i.e., determined at block 502) and an amount of local memory (e.g., register files and local data store (LDS) memory) that is allocated (e.g., available) to store the data for the tile being processed. For example, the input tile size is determined based on an amount of local memory allocated (e.g., available) to maintain a selected data reuse technique (e.g., an activation-stationary technique of storing the data of intermediate activation maps (also referred to as feature maps) in the local memory, a weight-stationary data reuse technique of storing weight data in the local memory, or another type of data reuse technique).

The amount of local memory allocated (e.g., available) to store the data for the tile being processed is determined, for example, using EQUATION 1 below:

$$(Wp+N_R)(Hp+N_C) \qquad \text{EQUATION 1}$$

where W is the width (e.g., in pixels) of the tile being processed, H is the height (e.g., in pixels) of the tile being processed, p is the number of bits representing each pixel, $N_R$ is the number of rows of padded data and $N_C$ is the number of columns of padded data. In addition, the number of rows of padded data are based on a number of convolution layers. For example, as described below with regard to the example network in FIG. 6, there are 6 rows of padded data and 6 columns of padded data in the example SISR network in FIG. 6 because the network includes 6 3×3 convolution layers of stride 1 and pad 1. However, the number of rows and columns (i.e., padded values) can be different than the number (i.e., 6) of rows and columns shown in FIG. 6 and is determined based on convolution kernel size, stride and padding, which affects the resulting receptive field of the layer.

The local memory is, for example, at least one of register file 240 and local data storage 242, local to a compute unit 132 shown in FIG. 2.

Determining the input tile size includes, for example, determining whether the amount of local memory allocated to store the data is an amount sufficient to store each portion of data of the receptive field. When it is determined that the amount of local memory allocated to store the data is an amount sufficient to store each portion of data of the receptive field, which includes the data of the input tile and padded data (i.e., data for the additional pixels making up the difference between the size of the tile and the size of the receptive field), the size of the input tile is determined to be the size of the receptive field and the padded data.

For example, as shown in FIG. 6, when it is determined that the amount of local memory allocated to store the data is an amount sufficient to store each portion of data of the receptive field 605, the size of the input tile 604*a* is determined to be the size of the receptive field 605. Accordingly, the data of the input tile 604*a*, plus the amount of padded data (which is determined as described above) for the additional 6 rows (+6 in this example) of pixels above and below the input tile 604*a* and the additional 6 columns (+6 in this example) of pixels to the left and right of the input tile 604*a*, is stored in local memory.

When it is determined that the amount of local memory allocated to store the data is not an amount sufficient to store each portion of data of the receptive field, the size of the input tile is determined to be a size as close to the size of the receptive field 605 such that the amount of local memory data is sufficient to store the data for the determined size of the input tile 604*a*.

Because the size of the input tile is determined based on the receptive field, the amount of padded data (i.e., pad size) and an amount of local memory allocated (e.g., available) to store the data an amount of local memory sufficient to store the data, the resulting output tile 612 of output image 610 does not generate artifacts and additional computation overhead (e.g., padding computations) from tile overlap is avoided. In addition, the external memory bandwidth is reduced, resulting in decreased power consumption. That is, the overall power consumption is reduced while maintaining visual quality.

As shown at block 506, the method 500 includes storing the padded input data to local memory.

As described above, when it is determined that the amount of local memory allocated to store the data is an amount sufficient to store each portion of data of the receptive field 605, the size of the input tile 604*a* is determined to be the size of the receptive field 605 and the data. Accordingly, in the example shown in FIG. 6, the data of the padded input tile (i.e., the data of the input tile 604*a* plus the padded data for the additional 6 rows (+6) of pixels above and below the input tile 604*a* and the additional 6 columns (+6) of pixels to the left and right of the input tile 604*a*) is stored in local memory.

When it is determined that the amount of local memory allocated to store the data is not an amount sufficient to store each portion of data of the receptive field, the size of the input tile is determined to be a size as close to the size of the receptive field 605 such that the amount of local memory data is sufficient to store the data for the determined size of the input tile 604*a*. That is, the data of the padded input tile is equal to the data of the input tile 604*a* plus the padded data for any number of additional rows of pixels and any number of additional columns of pixels comprising the determined input tile size. In some cases, the tile size is determined to be the size of the input tile and, therefore, does not include any padding.

As shown at block 508, the method 500 includes performing a forward inference. For example, as show at FIG. 6, forward inference processing includes processing the input tile for different feature maps. In the example shown in FIG. 6, the size of the input tile of a second feature map includes a size having 2 times the width and 2 times the height of the first feature map because the SISR network shown in FIG. 2 includes a 2×2 image upscaling. However, the specific output tile size depends on the particular network being used and the level (e.g., percent) of image upscaling being used for the network, including no imagine upscaling. For example, in a network used for noise reduction, the output tile size can be the same as input size.

As shown at block 510, the method 500 includes storing the data for the unpadded output tile to main memory. That is, the data of the input tile 604*a* is stored in main memory without the padded data.

As shown at decision block 512, the method 500 includes determining whether there is another tile (next tile) 604 is to be processed. When it is determined that there is another tile 604 to be processed, the method proceeds back to block 506 and the process described above with regard to blocks 506-510 is performed for the next tile 604 of the frame 602. When it is determined that there is no other tile 604 to be processed, the processing for the frame ends at 514.

Figure 7A:
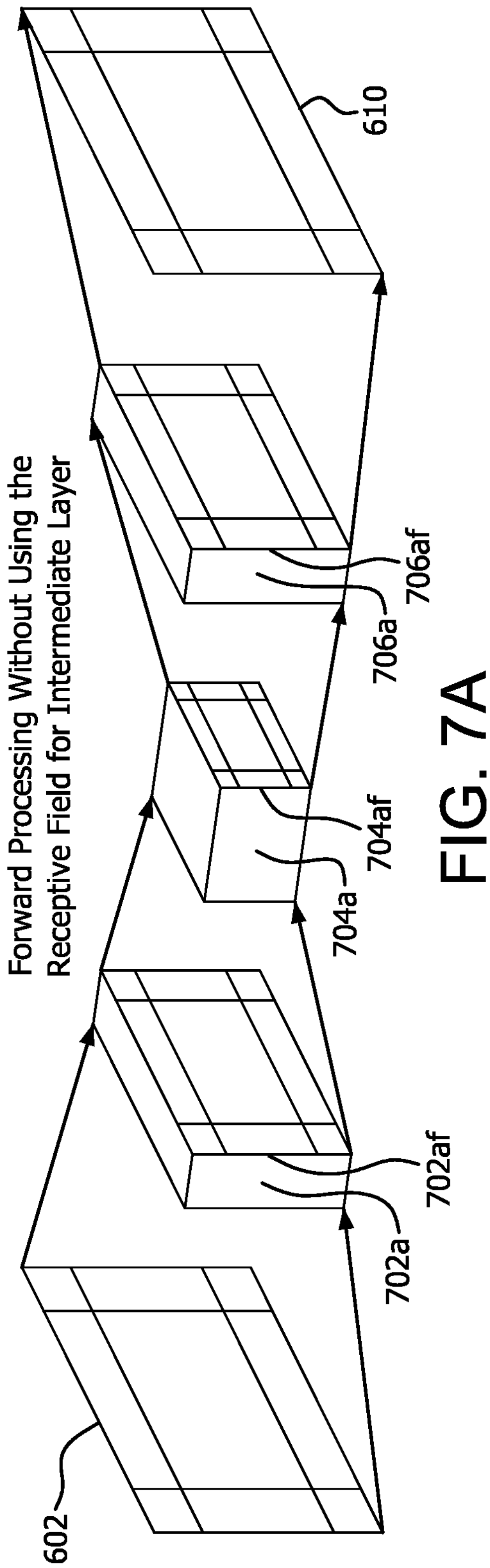
FIG. 7A is a block diagram illustrating an example flow of forward processing without using a receptive field for intermediate layers.
Figure 7B:
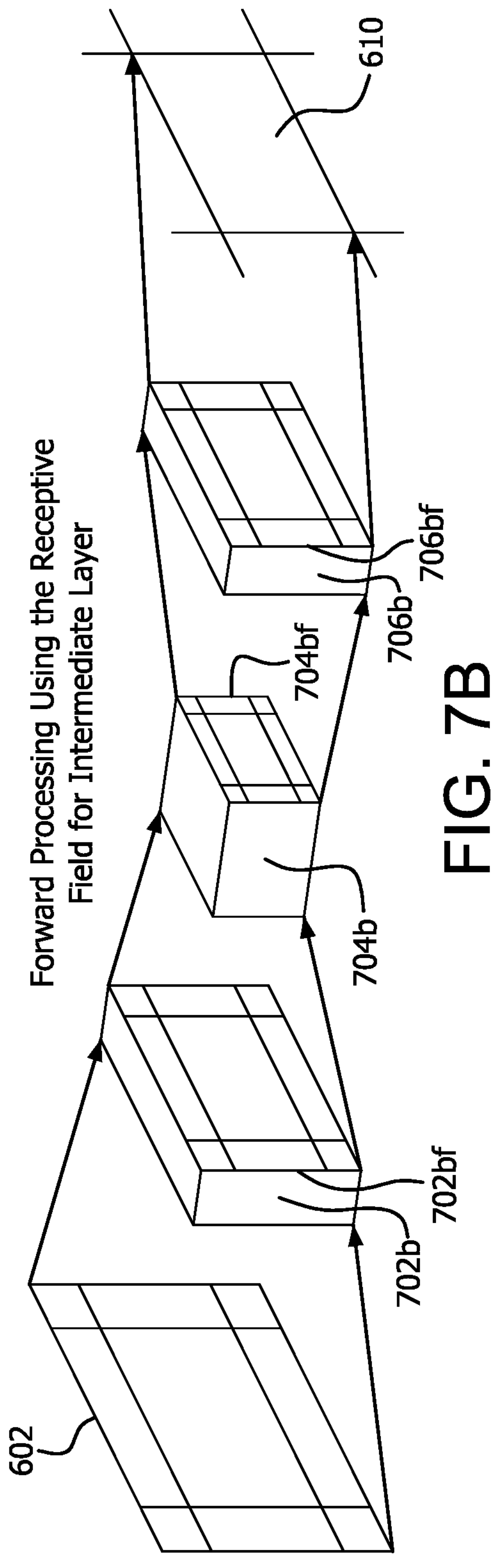
FIG. 7B is a block diagram illustrating an example flow of forward processing using a receptive field for intermediate layers.

FIGS. 7A and 7B show the differences between forward processing (i.e., forward propagation) of an input tile without using a receptive field for the intermediate layers and processing of an input tile using a receptive field for the intermediate layers. FIG. 7A is a block diagram illustrating an example flow of forward processing without using a receptive field for intermediate layers. That is, in the example forward processing shown in FIG. 7A, the input tile and padding are fully computed to an output tile with padding, while the data of the center rectangle is written back to local memory. FIG. 7B is a block diagram illustrating an example flow of forward processing using a receptive field for intermediate layers. That is, recognizing that the output padding is not written back to memory, FIG. 7B illustrates an example of efficient forward processing in which the amount of padding is reduced for layers of the network which do not represent the data of the output tile 612 of the output image 610 without padding. By reducing the non-contributing padding for each layer, the amount of computation is reduced (e.g., the padding computation in the SISR example is reduced by half). The overhead used to determine the efficient forward flow is performed offline during compilation such that additional runtime overhead is not incurred.

As shown in FIG. 7A, the CNN forward propagation includes a plurality of intermediate layers 702*a*, 702*b* and 702*c* and a feature map 702*af*, 704*af* and 706*af* as the output of the respective intermediate layers. Likewise, as shown in FIG. 7B, the CNN forward propagation includes a plurality of intermediate layers 702*b*, 704*b* and 706*b* and a feature map 702*bf*, 704*bf* and 706*bf* as the output of the respective intermediate layers.

In another example, the forward processing shown at block 508 can also include processing the input tile using the receptive field for each intermediate layer (as opposed to the receptive field for the input tile of the input image, which facilitates reduced computation overhead and lower local memory requirement. Receptive field metadata is tagged (e.g., stored) for each layer during back-propagation. During forward processing, the receptive field associated with each layer is dispatched (e.g., earlier stored metadata stored is being used to process a subsequent layer).

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, 302, the input driver 112, the input devices 108, the output driver 114, the output devices 110, the accelerated processing device 116, the scheduler 136, the compute units 132, the SIMD units 138, encoder 140, decoder 308, display 118, image sensors 402 and 404 and ISP 406 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of processing an image using a convolutional neural network (CNN), the method comprising:

determining, for an input tile of the image, a receptive field via backward propagation;

determining, for the input tile, a smallest input size of the input tile that produces an output tile when performing forward inference processing using the CNN, the smallest input size being determined using:
the receptive field, and
an amount of local memory allocated for storing intermediate feature maps generated for the input tile; and
processing the image by using the smallest input size to perform the forward inference processing.

2. The method of claim 1, wherein the local memory is a portion of memory local to a processor processing the input tile.

3. The method of claim 2, wherein the local memory is local data storage.

4. The method of claim 2, wherein the local memory is a local register file.

5. The method of claim 1, further comprising determining whether the amount of the local memory is an amount sufficient to store each portion of data of the receptive field.

6. The method of claim 5, further comprising:
storing the data for the input tile and padded data for the receptive field in the local memory.

7. The method of claim 6, further comprising:
performing the forward inference processing using the smallest input size determined; and
storing the data for the input tile to a non-local memory without storing the padded data for the receptive field to the non-local memory.

8. The method of claim 7, further comprising reducing an amount of the padded data for layers of the CNN during the forward inference processing.

9. The method of claim 1, further comprising:
determining an amount of the local memory to allocate to store data for the input tile such that a selected data reuse technique is maintained.

10. A device for processing an image using a convolutional neural network (CNN), the device comprising:
memory; and
a processor configured to:
determine, for an input tile of the image, a receptive field via backward propagation; and
determine, for the input tile, a smallest input size that produces an output tile when performing forward inference processing using the CNN, the smallest input size being determined using:
the receptive field, and
an amount of local memory allocated to store intermediate feature maps generated in response to the input tile; and
process the image by using the smallest input size to perform the forward inference processing.

11. The device of claim 10, wherein the local memory is a portion of the memory.

12. The device of claim 10, wherein the local memory is local data storage.

13. The device of claim 10, wherein the local memory is a local register file.

14. The device of claim 10, wherein the processor is further configured to determine whether the amount of the local memory is an amount sufficient to store data of the input tile and padded data for the receptive field.

15. The device of claim 14, wherein the processor is further configured to:
store data for the input tile and padded data for the receptive field in the local memory.

16. The device of claim 15, wherein the processor is further configured to:
perform the forward inference processing using the smallest input size determined; and
store data for the input tile to a non-local memory without storing the padded data for the receptive field to the non-local memory.

17. The device of claim 16, wherein the processor is further configured to: reduce an amount of the padded data for layers of the CNN during the forward inference processing.

18. The device of claim 10, wherein the processor is configured to determine an amount of the local memory to allocate to store data for the input tile such that a selected data reuse technique is maintained.

19. A non-transitory computer readable medium storing instructions for processing an image using a convolutional neural network (CNN), the instructions when executed by one or more processors cause the one or more processors to collectively execute a method comprising:
determining, for an input tile of the image, a receptive field via backward propagation;
determining, for the input tile, a smallest input size of the input tile that produces an output tile when performing forward inference processing using the CNN, the smallest input size being determined using:
the receptive field, and
an amount of local memory allocated for storing intermediate feature maps generated for the input tile; and
processing the image by using the smallest input size to perform the forward inference processing.

20. The non-transitory computer readable medium of claim 19, wherein the method further comprises determining whether the amount of the local memory allocated to store data of the input tile is an amount sufficient to store each portion of data of the receptive field.

* * * * *